(12) United States Patent
Reichert

(10) Patent No.: US 9,132,827 B2
(45) Date of Patent: Sep. 15, 2015

(54) METHOD AND APPARATUS FOR INFLUENCING AN AUTOMATIC TRANSMISSION

(75) Inventor: Thomas Reichert, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 107 days.

(21) Appl. No.: 14/006,619

(22) PCT Filed: Feb. 1, 2012

(86) PCT No.: PCT/EP2012/000422
§ 371 (c)(1),
(2), (4) Date: Sep. 20, 2013

(87) PCT Pub. No.: WO2012/126549
PCT Pub. Date: Sep. 27, 2012

(65) Prior Publication Data
US 2014/0011636 A1    Jan. 9, 2014

(30) Foreign Application Priority Data

Mar. 22, 2011  (DE) .......................... 10 2011 014 702

(51) Int. Cl.
*B60W 10/06* (2006.01)
*B60W 10/10* (2012.01)
(Continued)

(52) U.S. Cl.
CPC .............. *B60W 10/11* (2013.01); *B60W 10/06* (2013.01); *F16H 61/0213* (2013.01); *F16H 2061/0232* (2013.01); *Y10T 477/653* (2015.01); *Y10T 477/688* (2015.01)

(58) Field of Classification Search
CPC ................ B60W 10/06; B60W 10/10; B60W 2710/0644; B60W 2710/1005; Y10T 477/688

USPC ........................................................ 701/54
See application file for complete search history.

(56) References Cited

U.S. PATENT DOCUMENTS

| 5,315,897 A | 5/1994 | Abe et al. |
| 2006/0015234 A1 | 1/2006 | Luh |

(Continued)

FOREIGN PATENT DOCUMENTS

| CN | 101063484 A | 10/2007 |
| CN | 101078123 A | 5/2008 |

(Continued)

OTHER PUBLICATIONS

International Search Report issued by the European Patent Office in International Application PCT/EP2012/000422 on Jul. 11, 2012.

(Continued)

*Primary Examiner* — Edwin A Young
(74) *Attorney, Agent, or Firm* — Henry M. Feiereisen LLC.

(57) ABSTRACT

An apparatus for influencing an automatic transmission has a man-machine-interface, which is connected to a transmission controller for selecting a transmission ratio of the automatic transmission connected to an internal combustion engine, and a monitoring device for monitoring at least one operating parameter that is relevant to the wear of the internal combustion engine, wherein a threshold value of the operating parameter and a desired rotation speed range of the internal combustion engine that depends on the threshold value can be selected via the man-machine-interface, and wherein the transmission controller selects a transmission ratio on the basis of the monitoring device, by which an actual rotation speed of the internal combustion engine is adjusted within the desired rotation speed range. A method for influencing an automatic transmission is also described.

8 Claims, 1 Drawing Sheet

(51) Int. Cl.
  *B60W 10/11* (2012.01)
  *F16H 61/02* (2006.01)

(56) References Cited

U.S. PATENT DOCUMENTS

| | | | |
|---|---|---|---|
| 2009/0156360 A1* | 6/2009 | Barngrover et al. | 477/111 |
| 2010/0145581 A1* | 6/2010 | Hou | 701/50 |
| 2012/0252629 A1* | 10/2012 | Jung et al. | 477/79 |

FOREIGN PATENT DOCUMENTS

| | | |
|---|---|---|
| CN | 101230919 A | 7/2008 |
| DE | 34 04 667 | 8/1985 |
| DE | 40 31 870 | 4/1992 |
| DE | 41 14 033 | 11/1992 |
| DE | 42 19 362 | 12/1992 |
| DE | 199 43 068 | 3/2001 |
| DE | 100 57 935 | 5/2002 |
| DE | 102 22 665 | 12/2003 |
| DE | 102004004382 | 8/2005 |
| DE | 102007053708 | 3/2009 |

OTHER PUBLICATIONS

Chinese Search Report with respect to counterpart Chinese patent application 2012800142232, Dec. 23, 2014.
Translation of Chinese Search Report with respect to counterpart Chinese patent application 2012800142232, Dec. 23, 2014.

\* cited by examiner

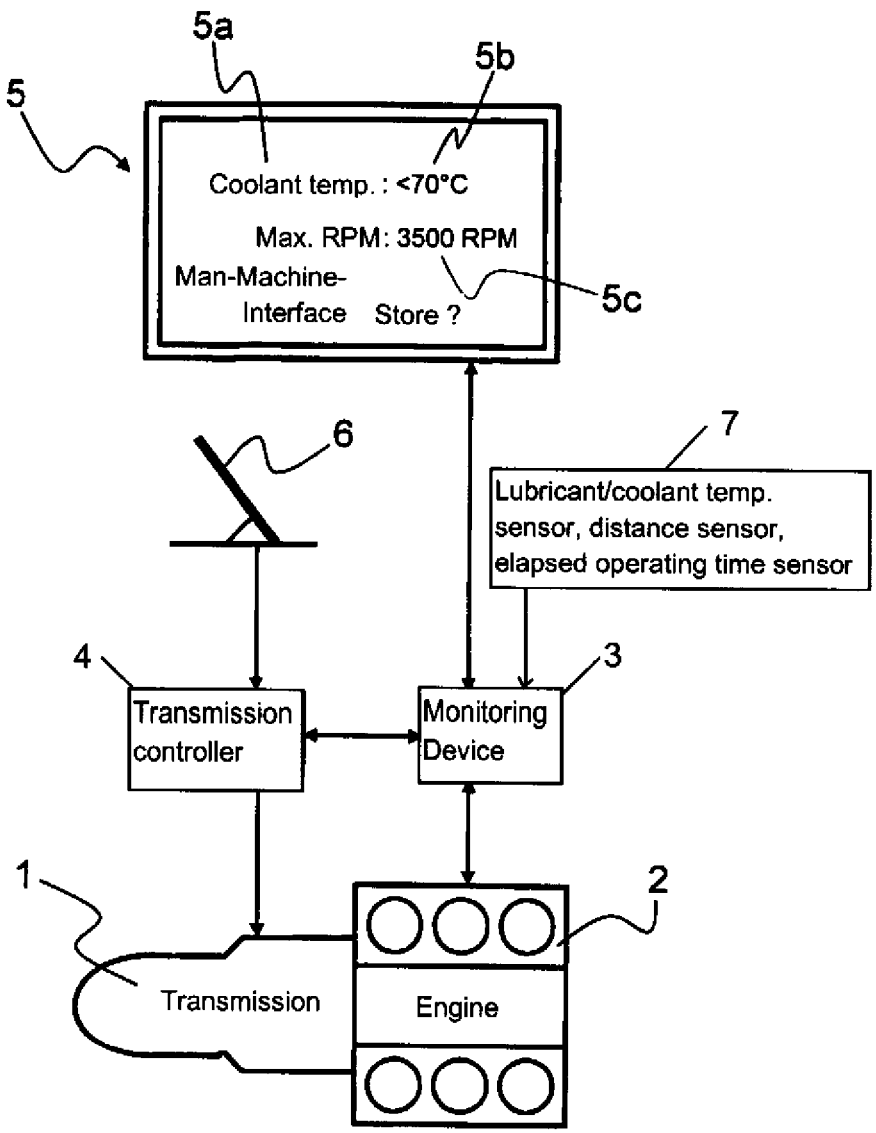

METHOD AND APPARATUS FOR INFLUENCING AN AUTOMATIC TRANSMISSION

CROSS-REFERENCES TO RELATED APPLICATIONS

This application is the U.S. National Stage of International Application No. PCT/EP2012/000422, filed Feb. 1, 2012, which designated the United States and has been published as International Publication No. WO 2012/126549 and which claims the priority of German Patent Application, Serial No. 10 2011 014 702.0, filed Mar. 22, 2011, pursuant to 35 U.S.C. 119(a)-(d).

BACKGROUND OF THE INVENTION

The present invention relates to a method and an apparatus for influencing an automatic transmission with an internal combustion engine connected to the automatic transmission, a transmission controller for setting a ratio of the automatic transmission, and at least one device for monitoring a wear-relevant operating parameter of the internal combustion engine.

Such methods and devices are used in the automotive industry to influence the switching strategy of an automatic transmission by adjusting the rotation speed of an associated internal combustion engine. In this context, all types of automatic transmissions, especially stepped automatic transmissions, continuously variable transmission or automated gear transmissions are to be understood to represent automatic transmissions. Internal combustion engines are subject to increased wear under certain operating conditions, for example during a start-up or warm-up phase. During these phases, unnecessary load on the internal combustion engine by high speeds should typically be avoided.

DE 40 31 870 A1 discloses a device for indicating the maximum permissible rotation speed of an internal combustion engine of a motor vehicle by a speed limit warning and a rotation speed warning range of the tachometer. The rotation speed limit or rotation speed warning range is calculated during start-up and/or warm-up phase of the internal combustion engine depending on at least one influencing variable for the engine service life, and adjusted according to the respective currently permissible maximum rotation speed. Operating the engine above the rotation speed limit warning or in the rotation speed warning range can be prevented by an engine engagement to limit the rotation speed.

The disadvantage is that the maximum rotation speed cannot be flexibly selected and the driver is restricted in the use of the motor vehicle in an uncomfortable way upon reaching the maximum rotation speed.

The generic document DE 102 22 665 A1 discloses a method for configuring an electronic transmission control device of an automatic transmission with one or more selectable transmission ratios of a motor vehicle. The user can select and optionally individually configure fixed switching programs of the automatic transmission via an input unit.

One disadvantage is that the offered switching programs do not necessarily contribute to a low-wear operation of the internal combustion engine connected to the automatic transmission.

SUMMARY OF THE INVENTION

It is therefore an object of the present invention to provide a method and an apparatus for influencing an automatic transmission which restricts a user as little as possible, while simultaneously operating the connected internal combustion engine with the least possible wear.

A method for influencing an automatic transmission includes the following steps:
Providing an input option for (user-defined) selection of at least one threshold value of a wear-related operating parameter of an internal combustion engine;
Providing an input option for (user-defined) setting of a threshold-dependent desired rotation speed range of the internal combustion engine;
Monitoring the selected operating parameters;
Influencing of the automatic transmission to adjust an actual rotation speed of the internal combustion engine within the desired rotation speed range.

By allowing the user of a vehicle with an internal combustion engine and the automatic transmission to assign to a wear-related operating parameter an associated threshold value associated with a desired rotation speed range of the internal combustion engine, accidentally leaving the desired rotation speed range can be prevented via the automatic transmission by a suitable selection of the transmission ratio. The desired rotation speed range may have both an upper and a lower limit. This greatly reduces the wear of the internal combustion engine, relieving the user of his obligation to continuously monitor the rotation speed in the start-up or warm-up phase of the internal combustion engine. In principle, automatic transmissions allow under all operating conditions a higher actual rotation speed of the internal combustion engine, wherein the present invention prevents unintentional leaving of the nominal rotation speed range under operating conditions conducive to wear, while still producing acceptable propulsion at a higher transmission ratio. The selected parameters can optionally be personalized and stored for a longer period of time, so that no further precautions need to be taken when stating the journey. The user thus does not feel patronized because he himself can set the operating parameter, the threshold value and the nominal rotation speed range. A conventional human-machine-interface with a display unit and a control unit is a particularly suitable input option.

In a preferred embodiment of the method, a next higher transmission ratio of the automatic transmission is set when the actual rotation speed is outside the desired rotation speed range. The choice of the next-higher transmission ratio represents a good compromise between rotation speed reduction and the offered continued performance.

In a preferred embodiment of the method, the desired rotation speed range is limited on one side by a user-defined maximum rotation speed. The one-sided limit of the desired rotation speed range by a maximum rotation speed is particularly user-friendly, because higher rotation speeds are usually more harmful than low rotation speeds. The lower limit may for example be predefined as the idle rotation speed of the internal combustion engine.

In a preferred embodiment of the method, the actual rotation speed may exceed the user-defined maximum rotation speed during a kick-down request. A kick-down request, i.e. an abrupt depression of the accelerator pedal, indicates a strong desire from the driver for acceleration, where a maximum rotation speed would only represent an impediment. In such situations, exceeding the maximum rotation speed may be allowed for safety reasons, regardless of the set threshold values of the operating parameters.

In a preferred embodiment of the method, several operating parameters are available. By allowing the user to select from several wear-relevant operating parameters, the user himself can associate the appropriate operating parameters with an associated threshold value and desired rotation speed range.

In a preferred embodiment of the method, a temperature of the operating equipment and/or a driving performance of the internal combustion engine may be selected as operating parameter. A temperature of the operating equipment indicates a warm-up phase and a driving performance indicates a running-in phase of the internal combustion engine. In general, the driving performance takes priority over the temperature of the operating equipment. The driving performance can be expressed by a distance traveled by the vehicle or a period of use.

In a preferred embodiment of the method, a lubricant temperature and/or a coolant temperature can be selected as the temperature of the operating equipment.

In a preferred embodiment of the method, several operating parameters and associated threshold values with corresponding threshold-dependent desired rotation speed ranges can be specified in a cascading fashion. Setting cascading desired rotation speed ranges allows a gradation of the desired rotation speed range in response to the operating parameters. For example, the maximum rotation speed can be successively raised during the start-up and/or warm-up phase.

An apparatus for influencing an automatic transmission has a human-machine-interface, which communicates with a transmission controller for selecting a transmission ratio of an automatic transmission connected to an internal combustion engine, and a monitoring device for monitoring at least one wear-relevant operating parameter of the internal combustion engine, wherein a threshold value of the operating parameter and threshold-dependent desired rotation speed range of the internal combustion engine can be selected via the human-machine-interface, and wherein the transmission control selects a transmission ratio depending on the monitoring device, with which an actual rotation speed of the internal combustion engine can be set within the desired rotation speed range.

The human-machine-interface is preferably designed as a screen dialogue with suitable input means, wherein a plurality of available operating parameters are provided to the user for selection, and suitable threshold values and desired rotation speed ranges can be suggested. Internal combustion engines may encompass conventional reciprocating piston or rotary piston engines, which are coupled to an automatic transmission on the output side.

In a preferred embodiment of the apparatus, the monitoring device for monitoring is operatively connected with a lubricant temperature sensor and/or a coolant temperature sensor and/or a distance sensor and/or an operating hour sensor. The listed sensors are standard equipment in a modern vehicle, so that no additional costs are incurred.

In a preferred embodiment of the apparatus, an actual rotation speed outside the desired rotation speed range can be set in response to a kick-down request at an accelerator pedal.

BRIEF DESCRIPTION OF THE DRAWING

Further details and advantages of the invention will become apparent from the following description of a preferred exemplary embodiment with reference to the drawing.

FIG. 1 shows in a schematic diagram a structure of an apparatus for influencing an automatic transmission.

DETAILED DESCRIPTION OF PREFERRED EMBODIMENTS

According to FIG. 1, an apparatus for influencing an automatic transmission 1 has an engine 2 that is on the output side connected to an automatic transmission 1. The automatic transmission 1 has a plurality of available transmission ratios that can be selected by a transmission controller 4 in response to a driver's request and the actual rotation speed of the internal combustion engine 2. A monitoring device 3 is configured to monitor one or more operating parameters 5a of the internal combustion engine 2. A user can select via a human-machine-interface 5 an appropriate operating parameter 5a and assign a threshold value 5b to the operating parameter 5a. As long as this threshold value 5b is not exceeded, a threshold-dependent maximum rotation speed 5c of the internal combustion engine 2 controls. If the actual rotation speed exceeds during this time the maximum rotation speed 5c, then the transmission controller 4 selects a higher transmission ratio stage until the actual rotation speed drops again below the maximum rotation speed 5c. If higher transmission ratio stages are no longer available, then the maximum rotation speed limit 5c forms limit of the actual rotation speed. When the user fully depresses the accelerator pedal 6 (so-called kick-down request), the maximum rotation speed 5c can be exceeded regardless of the threshold value 5b. The operating parameters 5a may be predefined and may in particular include a lubricant temperature, a coolant temperature, or a driving performance of the internal combustion engine 2, wherein the driving performance of the internal combustion engine 2 takes precedent over the temperatures. The operating parameters are transmitted to the monitoring device from appropriate sensors 7. The settings of the selected parameters 5a, 5b and 5c can be permanently stored and/or personalized.

LIST OF REFERENCE SYMBOLS

1 Automatic transmission
2. Internal combustion engine
3 Monitoring device for monitoring
4 Transmission controller
5 Man-Machine-Interface
5a Operating parameter
5b Threshold value
5c Maximum rotation speed
6 Accelerator pedal

The invention claimed is:

1. A method for influencing an automatic transmission, comprising:
   selecting on an input device at least one threshold value of a plurality of selected wear-related operating parameters of an internal combustion engine;
   setting on the input device a threshold-value-dependent desired rotation speed range of the internal combustion engine;
   monitoring operation of the internal combustion engine commensurate with the at least one threshold value of the selected wear-related operating parameter;
   controlling the automatic transmission with a transmission controller to adjust an actual rotation speed of the internal combustion engine within the desired rotation speed range.

2. The method of claim 1, further comprising setting a next higher gear of the automatic transmission when an actual rotation speed is outside the desired rotation speed range.

3. The method of claim 2, wherein the desired rotation speed range is delimited on one side by a user-defined maximum rotation speed.

4. The method of claim 3, wherein the actual rotation speed is allowed to exceed the user-defined maximum rotation speed in response to a kick-down request.

5. The method of claim 1, wherein the plurality of operating parameters comprises associated threshold values having corresponding threshold-dependent desired rotation speed ranges, wherein the rotation speed ranges are successively changed in response to the plurality of operating parameters.

6. A method for influencing an automatic transmission, comprising:
- selecting on an input device at least one threshold value of a selected wear-related operating parameter of an internal combustion engine, said wear-related operating parameter comprising at least one of a temperature of an operating medium, wherein the operating medium comprises at least one of a lubricant and a coolant, and a driving performance of the internal combustion engine;
- setting on the input device a threshold-value-dependent desired rotation speed range of the internal combustion engine;
- monitoring operation of the internal combustion engine commensurate with the at least one threshold value of the selected wear-related operating parameter;
- controlling the automatic transmission with a transmission controller to adjust an actual rotation speed of the internal combustion engine within the desired rotation speed range.

7. An apparatus for influencing an automatic transmission, the apparatus comprising:
- a man-machine-interface specifying a threshold value of an operating parameter and a threshold-dependent desired rotation speed range of an internal combustion engine in response to user input,
- a monitoring device connected to the man-machine-interface and operatively connected to at least one of a lubricant temperature sensor, a coolant temperature sensor, a distance sensor and an elapsed operating time sensor of the internal combustion engine and configured to monitor at least one wear-related operating parameter of the internal combustion engine, and
- a transmission controller configured to select a transmission ratio of the automatic transmission based on data relating to the at least one wear-related operating parameter received from the monitoring device and to adjust an actual rotation speed of the internal combustion engine within the desired rotation speed range of the internal combustion engine.

8. The apparatus of claim 7, wherein an actual rotation speed is adjusted to lie outside the desired rotation speed range in response to a kick-down request at an accelerator pedal.

* * * * *